United States Patent
Von Koenigsegg et al.

(10) Patent No.: US 12,066,082 B2
(45) Date of Patent: Aug. 20, 2024

(54) MULTI-SHAFT GEARBOX

(71) Applicant: KOENIGSEGG AUTOMOTIVE AB, Angelholm (SE)

(72) Inventors: Christian Von Koenigsegg, Vejbystrand (SE); Dag Bolenius, Stockholm (SE)

(73) Assignee: KOENIGSEGG AUTOMOTIVE AB, Angelholm (SE)

( * ) Notice: Subject to any disclaimer, the term of this patent is extended or adjusted under 35 U.S.C. 154(b) by 0 days.

(21) Appl. No.: 17/428,911

(22) PCT Filed: Feb. 7, 2020

(86) PCT No.: PCT/EP2020/053198
§ 371 (c)(1),
(2) Date: Aug. 5, 2021

(87) PCT Pub. No.: WO2020/161334
PCT Pub. Date: Aug. 13, 2020

(65) Prior Publication Data
US 2022/0128127 A1    Apr. 28, 2022

(30) Foreign Application Priority Data
Feb. 8, 2019 (EP) ..................................... 19156213

(51) Int. Cl.
 *F16H 3/091* (2006.01)
 *F16H 3/08* (2006.01)
 *F16H 3/093* (2006.01)

(52) U.S. Cl.
 CPC ..... *F16H 3/091* (2013.01); *F16H 2003/0826* (2013.01); *F16H 2003/0938* (2013.01); *F16H 2200/0065* (2013.01)

(58) Field of Classification Search
 CPC ............. F16H 3/091; F16H 2003/0826; F16H 2003/0938; F16H 2200/0065
 See application file for complete search history.

(56) References Cited

U.S. PATENT DOCUMENTS 8,220,352 B2   7/2012  Ross et al.
8,596,157 B2 * 12/2013  Vu .................... F16H 37/043
                                                      74/331

(Continued)

FOREIGN PATENT DOCUMENTS

EP   2726753   5/2014
EP   3279511   2/2018

(Continued)

OTHER PUBLICATIONS

International Search Report on corresponding PCT application (PCT/EP2020/053198) from International Searching Authority (EPO) dated Mar. 2, 2020.

(Continued)

*Primary Examiner* — Victor L MacArthur
(74) *Attorney, Agent, or Firm* — Shore IP Group, PLLC; Howard J. Klein

(57) ABSTRACT

A gearbox (10) is provided having: a gearbox case (12), a first shaft (14) for receiving torque, a second shaft (16) for transferring torque inside the gearbox case (12), and a third shaft (18) for delivering torque. The gearbox further has three or more first gear assemblies (20) located inside the gearbox case (12), wherein each first gear assembly (20) comprises a first gear wheel (22) centered on the first shaft (14), a second gear wheel (24) centered on the second shaft (16), and a wet clutch (26) configured for operationally connecting the first shaft (14) and the second shaft (16). The gearbox also has three or more second gear assemblies (30) located inside the gearbox case (12), wherein each second gear assembly (30) comprises a third gearwheel (32) centered on the second shaft (16), a fourth gear wheel (34) centered on the third shaft (18), and a wet clutch (36) configured for operationally connecting the second shaft (16) and the third shaft (18).

10 Claims, 6 Drawing Sheets

(56) References Cited

U.S. PATENT DOCUMENTS

| | | | |
|---|---|---|---|
| 9,879,761 B2* | 1/2018 | Vu | F16H 3/093 |
| 10,024,395 B2 | 7/2018 | Eo et al. | |
| 10,393,230 B2* | 8/2019 | Bulgrien | F16H 3/08 |
| 2012/0048043 A1 | 3/2012 | Vu | |
| 2016/0123430 A1 | 5/2016 | Vu et al. | |
| 2016/0146320 A1 | 5/2016 | Mordukhovich et al. | |
| 2018/0372188 A1* | 12/2018 | Hana | F16H 37/043 |

FOREIGN PATENT DOCUMENTS

| | | | |
|---|---|---|---|
| EP | 3428480 | | 1/2019 |
| GB | 2110324 | A | 6/1983 |
| GB | 2112883 | A | 7/1983 |

OTHER PUBLICATIONS

Written Opinion on corresponding PCT application (PCT/EP2020/053198) from International Searching Authority (EPO) dated Mar. 2, 2020.

* cited by examiner

| Gear assembly first set | No. teeth first gear wheel | No. teeth second gear wheel | Gear ratio | Multipl. factor | Mean | Mean^3 |
|---|---|---|---|---|---|---|
| 1A | 30 | 48 | 1,60 | | | |
| | | | | 1,30 | | |
| 1B | 34 | 42 | 1,24 | | 1,28 | 2,10 |
| | | | | 1,27 | | |
| 1C | 39 | 38 | 0,97 | | | |
| Gear assembly second set | No. teeth third gear wheel | No. teeth fourth gear wheel | Gear ratio | Multipl. factor | Mean | |
| 2A | 20 | 59 | 2,95 | | | |
| | | | | 2,10 | | |
| 2B | 32 | 45 | 1,41 | | 2,09 | |
| | | | | 2,09 | | |
| 2C | 46 | 31 | 0,67 | | | |
| Gear assembly reverse | No. teeth fifth gear wheel | No. teeth seventh gear wheel | Gear ratio | | | |
| 1D | 26 | 39 | 1,50 | | | |

Fig. 4

| Gear | Combination | Gear ratio |
|---|---|---|
| 1 | 1A + 2A | 4,72 |
| 2 | 1B + 2A | 3,66 |
| 3 | 1C + 2A | 2,86 |
| 4 | 1A + 2B | 2,26 |
| 5 | 1B + 2B | 1,75 |
| 6 | 1C + 2B | 1,37 |
| 7 | 1A + 2C | 1,07 |
| 8 | 1B + 2C | 0,83 |
| 9 | 1C + 2C | 0,65 |
| R | 1D + 2A | 4,43 |

Fig. 5

MULTI-SHAFT GEARBOX

TECHNICAL FIELD

The proposed technology generally relates to the field of gearboxes for road vehicles, and in particular to the field of gearboxes for high-performance cars.

BACKGROUND

Dual-clutch transmission (DCT) is a well-established technology implemented both in conventional passenger cars and in high-performance cars. In DCTs two clutches are arranged concentrically. Typically, a larger outer clutch drives the even-designated gear sets and a smaller inner clutch drives the odd-designated gear sets. It is possible to shifts gears without interrupting torque delivery to the drive wheels. This is achieved by engaging one of the clutches at the same time as the other clutch is disengaged. However, this seamless torque transfer is possible only in a shift from an odd gear to an even gear and vice versa. For example, short-shifting from the first to third gear or from the second to fourth gear is not possible.

Reciprocating internal combustion engines found in conventional passenger cars are typically able to operate over a relatively wide range of engine speeds. A wide-ratio transmission is typically used allowing the engine to operate over wider intervals of engine speeds to avoid frequent gear shifting, allowing for a more comfortable driving.

In high-performance cars, the engine is typically tuned for maximum torque in a narrow interval of engine speeds. To maximize acceleration, the engine speed is typically held near the point where maximum torque is developed. For example, a high-performance engine can develop maximum torque at 8500 revolutions per minute (rpm) and the engine speed is held within the operating interval 6500 to 8500 rpm during acceleration. To utilize the torque efficiently, a close-ratio type of gearbox is used to allow the engine to remain in the relatively narrow operating interval.

It is desirable to be able to drive a high-performance car having a close-ratio type of gearbox as a conventional passenger car with less but seamless gear shifting. However, this is not possible using a close ratio DCT, since short-shifting is not possible with this technology.

SUMMARY

In view of the above, an object of the present disclosure is to overcome or at least mitigate at least some of the mentioned drawbacks.

In a first aspect of the proposed technology, a gearbox is provided that comprises: a gearbox case, a first shaft, a second shaft, and a third shaft. The gearbox further comprises: a first set of gear assemblies located inside the gearbox case, wherein each gear assembly of the first set comprises a first gear wheel centered on the first shaft, a second gear wheel centered on the second shaft, and a wet clutch configured for operationally connecting the first shaft and the second shaft, or to engage and disengage the gear assembly. This is intended to control torque transfer from the first shaft to the second shaft via the first gear wheel and the second gear wheel. The gearbox further comprises: a second set of gear assemblies located inside the gearbox case, wherein each gear assembly of the second set comprises a third gear wheel centered on the second shaft, a fourth gear wheel centered on the third shaft, and a wet clutch configured for operationally connecting the second shaft and the third shaft, or to engage and disengage the gear assembly. This is intended to control torque transfer from the second shaft to the third shaft via the third gear wheel and the fourth gear wheel.

The gearbox may be configured to be used in a road vehicle, in particular a high-performance car. It may be configured to adapt the output of a reciprocating internal combustion engine to the drive wheels of the road vehicle. It may be configured to connect permanently, or rigidly, to the crank shaft of the internal combustion engine. It may further be configured to connect permanently, or rigidly, to a final drive, that in turn may be connected to the drive wheels, for example by way of one or more axles.

The first shaft may be an input shaft. It may be configured for receiving torque, for example from the outside the gearbox case. Alternatively, the first shaft may receive torque internally in the gearbox, for example from another shaft or gear of the gearbox. The second shaft may be an internal shaft of the gearbox. It may be configured for transferring torque inside the gearbox case, for example between the first shaft and the third shaft. The third shaft may be an output shaft. It may be configured for delivering torque, for example to the outside of the gearbox case. Alternatively, the third shaft may deliver torque internally in the gearbox, for example to another shaft or gear of the gearbox.

The first shaft may be rigid, which means that it constitutes a single unit, or unitary body, that cannot split in smaller units or change shape during operation. Similarly, the second shaft and the third shaft may be rigid.

The first set of gear assemblies may be composed of three, or three or more, first gear assemblies. Similarly, the second set of gear assemblies may be composed of three, or three or more, second gear assemblies. Each of the first and second gear assemblies may comprise a single wet clutch. The fact that there are three or more first gear assemblies, or three or more second gear assemblies, means that they do not provide a high/low-gear selection that is common in trucks, off-road vehicles, and working machines.

The gearbox may be configured to convert, or convey, torque received by the first shaft to a torque delivered by the third shaft if, or only if, a wet clutch of a gear assembly of the first set is engaged and if a wet clutch of a gear assembly of the second set is engaged. The gearbox may be configured to convert, or convey, no torque received by the first shaft to a torque delivered by the third shaft (via the second shaft) if no wet clutch of the gear assemblies of the first set is engaged. The gearbox may be configured to convert, or convey, no torque received by the first shaft to a torque delivered by the third shaft (via the second shaft) if no wet clutch of the gear assemblies of the second set is engaged. The specifications described here means that there can be no additional gear assembly working by another principle than wet clutches. For example, there can be no engagement and disengagement by meshing of synchronizer rings in the gearbox.

The different gear assemblies of the first set may have, or define, different gear ratios between the second shaft and the first shaft. Similarly, the different gear assemblies of the second set may have, or define, different gear ratios between the third shaft and the second shaft.

The proposed gearbox allows for a smooth gear shifting with perceived seamless torque transfer, similar to that of a Dual-Clutch Transmission (DCT). Additionally, the proposed gearbox can short-shift, or skip a gear when shifting up or down, without losing torque transfer, which is not possible for DCT-technologies. For example, if there are three gear assemblies in the first set, the gear assembly having the highest gear ratio can be disengaged simultaneously to the gear assembly having the lowest gear ratio being engaged, effectively skipping the second gear, fifth gear, etc. depending on which gear assembly of the second set that is engaged. The ability to short-shift is particularly important if the gearbox is a close-ratio type of transmission, since it allows for a less-frequent shift of gears at lower speeds. The racing oriented close-ratio type transmission can then be operated as the more common transmission for passenger cars with greater changes in gear ratio percentagewise between neighboring lower gears than between neighboring higher gears.

In comparison with a classic manual-transmission, the wet clutch of each gear assembly replaces the selector, dog clutch, and synchronizer rings of a meshed gear wheel pair. Synchronizer rings are subjected to wear and it is contemplated that the removal of these components contributes to a longer lifetime of the gearbox.

Further, when all gear assemblies are disengaged, no torque will be transferred from the first shaft to the second shaft. The first shaft and any parts of the gear assemblies of the first set rigidly attached to the first shaft may then have the function of a flywheel, making a flywheel obsolete in the powertrain, or allows for a flywheel having smaller moment of inertia. Additionally, no clutch is required between the engine and the gearbox. The removal of these components contributes to a reduced weight, or compensates for any additional weight, of the gear assemblies.

It should be noted that the position of the wet clutches with respect to the gear wheels is not specified above. In each gear assembly, the wet-clutch can be positioned either before or after the gear wheels. The gear wheels may for example be helical cogwheels. In the gear assemblies of the first set, the first gear wheel may mesh with the second gear wheel. Similarly, in the gear assemblies of the second set, the third gear wheel may mesh with the fourth gear wheel.

In an alternative embodiment, the wet clutch of one or more, or all of, the gear assemblies is replaced by a dry clutch. For example, the wet clutch of all gear assemblies of the second set may be replaced by a dry clutch. A wet coupling has an advantage over a dry coupling in that the latter would not function if a liquid lubricating and/or cooling the gear wheels leaks into the dry coupling. It would require a dry coupling that is hermetically sealed if it is to be located inside the gearbox case. A dry coupling generally needs to be ventilated to accommodate for temperature and pressure changes, which adds to the complexity in implementing the try coupling in the proposed technology.

The gearbox may be configured for a operate at a rotation of the first shaft of at least 8000 rpm, 9000 rpm, 10000 rpm. The gearbox may have a minimum and maximum gear ratio between the third shaft and the first shaft that is within the range 0.6 to 5.0, or within the range 0.5 to 6.0. The ranges described here are suitable for high-performance cars.

In a second aspect of the proposed technology, a powertrain for a road vehicle is provided comprising: an internal combustion engine, a gearbox according to the first aspect of the proposed technology operatively connected to the internal combustion engine, and a final drive operatively connected to the gearbox. A final drive is understood to encompass an automotive differential.

The internal combustion engine may comprise a crankshaft, and the first shaft of the gearbox may be connected to the crankshaft for receiving torque from the crankshaft. The power train may be configured to function without a flywheel. This is achieved by configuring the first shaft and the parts of the gear assemblies of the first set locked or attached to the first shaft such that they have a combined weight and the moment of inertia sufficient for acting as a flywheel. The first shaft may be directly coupled to the crankshaft, which means that the coupling is gear-free and that there is no torque conversion, or a gear ratio/mechanical advantage of one, between the internal combustion engine and the gearbox. This does not exclude a spline connection between the crank shaft and the input shaft. The crankshaft and the first shaft may be collinear, and/or coaxially coupled, to one another. Similarly, the third shaft of the gearbox may be directly connected to the final drive for delivering torque to the final drive, or it may be directly coupled to an input of the final drive.

The first shaft may be permanently, or rigidly, coupled to the crank shaft, which means that there can be no clutch or torque converter between the combustion engine and the gearbox. Similarly, the third shaft may be permanently, or rigidly, coupled to the final drive, which means that there can be no clutch or torque converter between the gearbox and the final drive.

In a third aspect of the proposed technology, a road vehicle is provided comprising a powertrain according to the second aspect of the proposed technology. The road vehicle may further comprise a drive wheel. The drive wheel may be directly connected to the final drive for receiving torque therefrom, or it may be directly coupled to an output of the final drive. The drive wheel may be permanently, or rigidly, coupled to the final drive, which means that there can be no clutch or torque converter between the gearbox and the final drive. The road vehicle may further comprise a drive axle connecting the drive wheel to the final drive.

Further optional details of the proposed technology are described below.

In the gearbox of the first aspect of the proposed technology, the first shaft, second shaft, and third shaft may not be permanently rotationally locked, or can rotate freely with respect to one another when all gear assemblies, or the wet couplings of all the gear assemblies, are disengaged. This allows for a multiplicative number of gears. For example, if there are two gear assemblies in the first set and two gear assemblies in the second set, the total number of gears is four, and if there are three gear assemblies in the first set and two gear assemblies in the second set, the total number of gears is six. The multiplicative number of gears would not be possible if the shafts were permanently locked to one another.

The wet clutch of each gear assembly of the first set, or each first gear assembly, may be centered on, or mounted on, the first shaft. It may further operationally connect the first gear wheel and the first shaft. This means that the first gears and second gears are position after the wet clutch, which means that they can be disengaged from the first shaft. This results in a minimized rotating mass, or moment of inertia, of the first shaft, which contributes to a faster response when changing the rotational speed of the first shaft in a gear shifting. This is particularly important when a gear shifting involves the gear assemblies of the first set, and also if the first shaft is an input shaft configured to receiving torque from the outside of the gearbox case.

A gear assembly of the first set, or a first gear assembly, providing the lowest gear ratio between the second shaft and the first shaft may provide a gear ratio that is less than one. A high-performance car is typically torque limited by the road contact of the drive wheels at low gears and by the engine at high gears, or at the highest gear. The specified gear ratio contributes to reduced rotational speed of the first shaft at top speeds, which in turn contributes to a reduced drag between the clutch plates in the other gear assemblies of the first set. The power loss in the gearbox is then reduced and a faster top speed is possible. It is particularly advantageous in combination if there is a reverse gear assembly having a wet clutch and connecting the first shaft and the second shaft.

A gear assembly of the second set, or a second gear assembly, providing the lowest gear ratio between the third shaft and the second shaft may provide a gear ratio that is less than one. This is particularly advantageous in combination with a gear assembly of the first set, or a first gear assembly, providing a gear ratio that is less than one. The rotational speed of the first shaft at top speed is then further reduced, which contributes to less drag losses in the gearbox.

A gear assembly of the second set may provide a gear ratio between the third shaft and the second shaft that is greater than the gear ratios between the second shaft and the first shaft provided by all gear assemblies of the first set. Additionally, a gear assembly of the second set may provide a gear ratio between the third shaft and the second shaft that is smaller than the gear ratios between the second shaft and the first shaft provided by all gear assemblies of the first set.

A gear assembly of the first set, or the first gear assembly, providing the highest gear ratio, and/or a gear ratio greater than one, between the second shaft and the first shaft may have its wet clutch centered, or positioned, on the second shaft. A gear assembly of the first set, or the first gear assembly, providing the lowest gear ratio, and/or a gear ratio less than one, between the second shaft and the first shaft may have its wet clutch centered, or positioned, on the first shaft. Similarly, a gear assembly of the second set, or the second gear assembly, providing the highest gear ratio, and/or a gear ratio greater than one, between the third shaft and the second shaft may have its wet clutch centered, or positioned, on the third shaft. A gear assembly of the second set, or the second gear assembly, providing the lowest gear ratio, and/or a gear ratio less than one, between the third shaft and the second shaft may have its wet clutch centered, or positioned, on the second shaft. This typically has the effect of reduced differences in rotational speeds between clutch plates when the wet clutch is disengaged or open, which contributes to a reduced drag and power loss in the wet clutch. This effect is typically greater for the gear assemblies of the first set, since the difference in rotational speeds is generally greater between the first shaft and the second shaft than between the second shaft and the third shaft. On the other hand, the proposed positions of the wet clutches and typically have the effect of an increased torque between clutch plates when the wet clutch is engaged or closed, which contributes to an increased wear on the wet clutch.

The gear assembly of the second set, or the second gear assembly, providing the lowest gear ratio between the third shaft and the second shaft may be the only gear assembly of the second set that has its wet clutch centered, or positioned, on the second shaft. Alternatively, only a single gear assembly of the second set, or a single second gear assembly, may have its wet clutch centered, or positioned, on the second shaft. Alternatively, the wet clutch of each gear assembly of the second set, or each second gear assembly, may be centered on, or mounted on, the third shaft. This contributes to a more compact gearbox, since the number of gear wheels on the second shaft is the sum of the number of gear wheel on the first and third shaft, which means that there is little space along the second shaft that is available for wet clutches.

The wet clutches of the first gear assembly and the second gear assembly may be of the same type and manufacture, or they may have the same, or approximately the same, operational characteristics.

Here, and throughout these specifications, a gear ratio is understood as corresponding to the number of teeth of an output gear wheel over the number of teeth of a meshing input gear wheel. For example, in a gear assembly of the first set, the gear ratio corresponds to the number of teeth of the second gear wheel over the number of teeth of the first gear wheel. Similarly, in a gear assembly of the second set, the gear ratio corresponds to the number of teeth of the fourth gear wheel over the number of teeth of the third gear wheel.

A gear assembly of the first set may define, or have, a gear ratio that is less than one. A gear assembly of the second set may define, or have, a gear ratio that is less than one. In combination, this allows for a gearbox having several gear shift settings and simultaneously a significant overdrive capacity, which is advantageous for high performance vehicles, or for reduced fuel consumption when coasting at high speeds.

The gearbox may further comprise: a counter shaft and a reverse gear assembly located inside the gearbox case comprising a wet clutch and a reverse gear set with gear wheels centered on each of the first shaft, the counter shaft, and the second shaft. The reverse gear assembly and/or wet clutch is configured for operationally connecting the first shaft and the second shaft via the counter shaft and the reverse gear set, or for engaging and disengaging the reverse gear assembly to control torque transfer from the first shaft to the second shaft via the counter shaft.

The counter shaft results in a reversed rotational direction of the second shaft, and consequently in a reversed rotational direction of the third shaft. The reverse gear assembly may provide a gear ratio that is greater than one, or greater than four. The wet clutch of the reversed gear assembly may be centered, or positioned, on the second shaft, which typically would result in a reduced torque load on the wet clutch.

The reverse gear set may comprise a fifth gear wheel centered on the first shaft, a sixth gear wheel centered on the counter shaft, and a seventh gear wheel centered on the second shaft. The fifth gear wheel may mesh with the sixth gear wheel, and the sixth gear wheel may mesh with the seventh gear wheel. Alternatively, the reverse gear set may comprise a fifth gear wheel centered on the first shaft, a sixth gear wheel and a seventh gear wheel centered in the counter shaft, and an eighth gear wheel centered on the second shaft. The fifth gear wheel may mesh with the sixth gear wheel, and the seventh gear wheel may mesh with the eighth gear wheel.

Alternatively, the gearbox may further comprise: a counter shaft, a reverse gear assembly located inside the gearbox case comprising a wet clutch and a reverse gear set with gear wheels centered on each of the second shaft, the counter shaft, and the third shaft. The reverse gear assembly and/or wet clutch is configured for operationally connecting the second shaft and the third shaft via the counter shaft and the reverse gear set, or for engaging and disengaging the reverse gear assembly to control torque transfer from the first shaft to the second shaft via the counter shaft.

The counter shaft results in a reversed rotational direction of the third shaft. The reverse gear assembly may have a gear ratio that is greater than one. The wet clutch of the reversed gear assembly may be centered, or positioned, on the second shaft. This has the effect of reduced differences in rotational speeds between clutch plates when the wet clutch is disengaged or open, which contributes to a reduced drag and power loss. The rotational speed of the third shaft is typically less than the rotational speed of the second shaft. Thus, this embodiment with the reversed gear assembly positioned between second shaft and the third shaft typically results in a lower drag than the embodiment where it is positioned between the first shaft and the second shaft.

The reverse gear set may comprise a fifth gear wheel centered on the second shaft, a sixth gear wheel centered on the counter shaft, and a seventh gear wheel centered on the third shaft. The fifth gear wheel may mesh with the sixth gear wheel, and the sixth gear wheel may mesh with the seventh gear wheel. Alternatively, the reverse gear set may comprise a fifth gear wheel centered on the second shaft, a sixth gear wheel and a seventh gear wheel centered on the counter shaft, and an eighth gear wheel centered on the third shaft. The fifth gear wheel may mesh with the sixth gear wheel, and the seventh gear wheel may mesh with the eighth gear wheel.

The proposed embodiments for a reverse gear allows for several selectable reverse gears. For example, if the reverse gear assembly connects the second shaft and the third shaft, the gear assemblies of the first set can be used to smoothly shift reverse gears.

For each gear assembly, one of the gear wheels may be rotationally fixed relative, or rigidly attached, to the shaft it is centered on, and the other, or another, gear wheel of the same gear assembly may be a rotationally supported gear wheel that can rotate relative to the shaft it is centered on. The wet clutch of the gear assembly is then centered, or positioned, on the same shaft as the rotationally supported gear wheel and operationally connects the rotationally supported gear wheel to the shaft it is centered, or positioned, on. This means that when the wet clutch is engaged or closed, the proposed technology allows for a torque to be transferred from the third shaft to the first shaft, which allows for a vehicle with the gearbox installed to engine brake. This means that there can be no one-way bearing or sprag clutch between the gear wheel that is rotationally fixed and the shaft it is centered on. A rotationally supported gear wheel is understood to encompass the gear wheel being connected to the shaft it is centered on by a radial bearing that can rotate in any direction.

The gear assembly, or wet clutch, being disengaged, or open, means that the rotationally supported gear wheel can rotate, or spin freely, relative to the shaft it is centered on. The gear assembly, or wet clutch, being engaged, or closed, means that the wet clutch releasably locks the rotationally supported gear wheel to the shaft it is centered, or positioned, on. To be more specific, the wet clutch being engaged is understood as the wet clutch transferring or conveying some or all torque supplied to it. This encompasses the wet clutch being rigidly locked and providing rigid mechanical linkage for torque transfer, but also the wet clutch slipping during disengagement and reengagement. The wet clutch being disengaged is understood as the wet clutch effectively transferring or conveying no torque supplied to it. This encompasses the wet clutch being fully open and providing no mechanical torque transfer. There may be some fluid drag in the wet clutch when it is disengaged. A gear assembly being engaged is understood as its wet clutch being engaged. Similarly, a gear assembly being dis engaged is understood as its wet clutch being disengaged.

Here, and throughout these specifications, if not further specified, the term each wet clutch is understood to encompass a wet clutch of each of the gear assemblies of the first and second sets, and optionally a wet clutch of the reverse gear assembly if forming part of the embodiment. Additionally, if not further specified, the term one of the gear wheels of a gear seat is understood to encompass one of the first gear wheel and the second gear wheel of the gear assemblies of the first set, one of the third gear wheel and the fourth gear wheel of the gear assemblies of the second set, or one of the fifth gear wheel, the sixth gear wheel, and the seventh gear wheel of the reverse gear assembly.

Each wet clutch, or one or more of the wet clutches, may be a multiple-plate clutch. This allows for a smaller diameter of the wet clutch, which in turn allows for a more compact gear box.

The multiple-plate clutch may comprise: a clutch basket having a plurality clutch plates extending radially inwards relative to the shaft on which the wet clutch is centered, or positioned, wherein the clutch basket is attached, or rigidly connected, to the rotationally supported gear wheel of the same gear assembly. The wet clutch may also have a clutch hub having a plurality of clutch plates extending radially outwards relative to the shaft on which the wet clutch is centered, or positioned, wherein the clutch hub is angularly fixed relative to the shaft and configured to allow a lengthwise shift relative to the shaft.

When the wet clutch is disengaged, or open, the clutch hub may spin freely relative to the clutch basket. When the wet clutch is engaged, or closed, the clutch plates of the clutch hub may be pressed against the clutch plates of the clutch basket. The clutch plates of the clutch basket and the clutch plates of the clutch hub may be interleaved in a clutch pack, and the clutch pack may be compressed axially in the engaged state.

The clutch basket may have a number of apertures configured to allow a lubricating liquid and/or cooling liquid to enter the wet clutch for lubricating and/or cooling of the clutch plates.

The ratio between the highest and lowest gear ratios of the gear assemblies of the first set may be smaller than the ratio between the highest and lowest gear ratios of the gear assemblies of the second set. This means that in an ordered sequence of gear shifting, all gear assemblies of the first set are activated/deactivated between the activation/deactivation of neighboring gear assemblies of the second set.

The first set of gear assemblies may constitute a first series of gear assemblies with decreasing gear ratios between the second shaft and the first shaft, wherein neighboring gear assemblies in the first series have gear ratios differing by a first multiplicative factor, and each first multiplicative factor deviates from the mean of the first multiplicative factors by less than 10%, 5%, or 3%. Similarly, the second set of gear assemblies may constitute a second series of gear assemblies with decreasing gear ratios between the third shaft the second shaft, wherein neighboring gear assemblies in the second series have gear ratios differing by a second multiplicative factor, and each second multiplicative factor deviates from the mean of the second multiplicative factors by less than 10%, 5%, or 3%. The mean of the second multiplicative factor may deviate by less than 10%, 5%, or 3% from the mean of the first multiplicative factor multiplied with itself a number of times corresponding to the number of gear assemblies in the first set, or the number of first gear assemblies.

The first set of gear assemblies may be constituted by a first, second and third gear assembly, wherein the gear ratio of the second gear assembly is in the range 73-83%, or 76-80%, of the gear ratio of the first gear assembly, and the gear ratio of the third gear assembly is in the range 73-83%, or 76-80%, of the gear ratio of the second gear assembly. The second set of gear assemblies may be constituted by a fourth, fifth and sixth gear assembly, wherein the gear ratio of the fifth gear assembly is in the range 44-52%, or 46-50%, of the gear ratio of the fourth gear assembly, and the gear ratio of the sixth gear assembly is in the range 44-52%, or 46-50%, of the gear ratio of the fifth gear assembly.

It has been found that the above defined differences in gear ratios are suitable for obtaining a close-ratio type of transmission with three gear assemblies in first set and three gear assemblies in second set. Thus, the number of gear assemblies in the first set of gear assemblies may be three, or three or more. The number of gear assemblies in the second set of gear assemblies may be three, or three or more. This means that the gearbox will have nine selectable gears, or nine or more selectable gears.

The gearbox may further comprise a control unit operationally connected to each wet clutch. Operationally connected means that the control unit controls the function of each wet clutch. For example, it may be configured to engage or disengage each wet clutch. The control unit may be located outside the gearbox case. The control unit may be configured to engage or disengage each wet clutch upon receiving a command signal, such as an electronic or digital signal. The command signal may be generated following manual action, for example by the actuation of paddles causing the gearbox to function in a semi-automatic transmission. Alternatively, the command signal may be automatically generated, such as in an automatic transmission.

A wet clutch of a first gear assembly may have a shaft side rotationally fixed relative to, or attached to, the first shaft and a gear side rotationally fixed relative to, or attached to, the first gear wheel. The first gear assembly may provide the highest gear ratio between the second shaft and the first shaft, and the control unit may be configured to operate the first gear assembly at a counter-rotation of the shaft side and the gear side when the gear assembly, or the wet clutch, is disengaged. A counter-rotation rotation is here understood as the shaft side and the gear side rotating in opposite directions. That the control unit is configured to operate the first gear assembly means that it can change the gear assembly from disengaged to engaged. Additionally, the control unit may be configured to operate the first gear assembly, and/or the wet clutch may be configured to operate, at a difference in rotation between the shaft side and the gear side that is at least in the range 0 to 6000 rpm, or at least in the in the range 0 to 9 000 rpm, with the shaft side and the gear side counter-rotating. The control unit may further be configured to operate the first gear assembly at a co-rotation of the shaft side and the gear side when the gear assembly, or the wet clutch, is disengaged. A co-rotation rotation is here understood as the shaft side and the gear side rotating in the same directions. Additionally, the control unit may be configured to operate the first gear assembly, and/or the wet clutch may be configured to operate, at a difference in rotation between the shaft side and the gear side that is at least in the range 0 to 6000 rpm, or at least in the in the range 0 to 9000 rpm, with the shaft side and the gear side co-rotating.

A wet clutch of a second gear assembly may have a shaft side rotationally fixed relative to, or attached to, the third shaft and a gear side rotationally fixed relative to, or attached to, the fourth gear wheel. The second gear assembly may provide the highest gear ratio between the third shaft and the second shaft, and the control unit may be configured to operate the second gear assembly at a co-rotation of the shaft side and the gear side when the gear assembly, or the wet clutch, is disengaged. Additionally, the control unit may be configured to operate the first gear assembly, and/or the wet clutch may be configured to operate, at a difference in rotation between the shaft side and the gear side that is at least in the range 0 to 10000 rpm, or at least in the in the range 0 to 12000 rpm, with the shaft side and the gear side co-rotating. The control unit may further be configured to operate the second gear assembly at a counter-rotation of the shaft side and the gear side when the gear assembly, or the wet clutch, is disengaged. Additionally, the control unit may be configured to operate the second gear assembly at, and/or the wet clutch may be configured to operate, a difference in rotation between the shaft side and the gear side that is at least in the range 0 to 6000 rpm, or at least in the in the range 0 to 9000 rpm, with the shaft side and the gear side counter-rotating.

The shaft side of a wet clutch may comprise a clutch hub fixed to the first/third shaft, and the gear side may comprise a clutch basket fixed to the first/fourth gear wheel. The clutch hub and the clutch basket may further be connected by a clutch pack having a disengaged state, a slipping state, and an engaged state.

A wet clutch of the abovementioned reverse gear assembly may have a shaft side rotationally fixed relative to, or attached to, the second shaft and a gear side rotationally fixed relative to, or attached to, one of the gear wheels of the reverse gear assembly, which may be the seventh gear wheel. The control unit may be configured to operate the first gear assembly, and/or the wet clutch may be configured to operate, at a difference in rotation between the shaft side and the gear side that is at least in the range 0 to 13000 rpm, or at least in the in the range 0 to 15000 rpm.

That a wet clutch can operate in a specified range of differences in rotation between the shaft side and the gear side means that it will not overheat in this range and that the components of the wet clutch will not degrade in performance, for example by the clutch plates of a clutch pack engaging The wet clutch of each gear assembly, an in extension the gear assembly as such, may have a disengaged state, a slipping state, and an engaged state. In the disengaged state, the clutch hub and the clutch basket can spin at different speeds and no torque is transferred between the clutch hub and the clutch basket, for example by static or kinetic mechanical friction. There may be some fluid friction between the clutch hub and the clutch basket caused by a lubricant, or coolant, in the wet clutch, which may result in a drag in the disengaged wet clutch. In the slipping state, the clutch hub and the clutch basket can spin at different speeds and torque is transferred between the clutch hub and the clutch basket by kinetic mechanical friction. In the engaged state, the clutch hub and the clutch basket spin at the same speeds and torque is transferred between the clutch hub and the clutch basket by static mechanical friction. It is understood that the abovementioned mechanical friction may be in a clutch pack connecting the clutch hub and the clutch basket.

The control unit may be configured to simultaneously set, or operate, two, or at least two, gear assemblies of the first set in the slipping state at an acceleration of the vehicle, or at an increasing rotational speed of the first shaft, and/or the third shaft, or at a zero rotational speed of the third shaft. It is understood that this is done as one of several settings of the control unit. Heat generated by kinetic friction during acceleration is then distributed between several gear assemblies, or several wet clutches. The dimensions of the wet clutches and associated cooling systems can then be made smaller. This is particularly advantageous if the ratio between the highest and lowest gear ratios of the gear assemblies of the first set is smaller than the ratio between the highest and lowest gear ratios of the gear assemblies of the second set, as is suggested above. The control unit may further be configured to simultaneously set, or operate, one of the gear assemblies of the second set in the engaged state.

The control unit may be configured to simultaneously set, or operate, a gear assembly of the first set in the slipping state and another gear assembly of the first set in the engaged state. It is understood that this is done as one of several settings of the control unit. For example, this may be prior to, or at a shifting of states, of the gear assemblies involved, which contributes to a swift gear shifting.

The control unit may be configured to set, or operate, a gear assembly of the first set in the slipping state, and to simultaneously set, or operate, a gear assembly of the second set in the slipping state. It is understood that this is done as one of several settings of the control unit. For example, this may be at an acceleration of the vehicle, or at an increasing rotational speed of the first shaft, and/or the third shaft, or at a zero rotational speed of the third shaft.

This means that the heat generated by kinetic friction during acceleration is distributed between several gear assemblies, or several wet clutches.

The control unit may be configured to short shift the gearbox. The first gear assemblies may constitute a first series of gear assemblies with decreasing gear ratios between the second shaft and the first shaft. The control unit may be configured to, with the first gear assembly having the highest gear ratio in the engaged state, or the slipping state, and with the first gear assembly having the lowest gear ration in the slipping state, or the disengaged state, change the state of the first gear assembly having the highest gear ratio to disengaged, and change first gear assembly having the lowest gear ratio to engaged. This allows for a short-shifting gearbox, provided that there are three or more first gear assemblies.

Similarly, the second gear assemblies may constitute a second series of gear assemblies with decreasing gear ratios between the third shaft and the second shaft. The control unit may be configured to, with the second gear assembly having the highest gear ratio in the engaged state, or the slipping state, and with the second gear assembly having the lowest gear ration in the slipping state, or the disengaged state, change the state of the second gear assembly having the highest gear ratio to disengaged, and change the second gear assembly having the lowest gear ratio to engaged. This also allows for a short-shifting gearbox, provided that there are three or more second gear assemblies.

Each wet clutch may be pneumatically or hydraulically operated and operationally connected to the control unit by a pneumatic or hydraulic conduit. Each of the shafts upon which a wet clutch is centered, or positioned, on may be hollow and each a pneumatic or hydraulic conduit may be connect to the a wet clutch from inside a hollow shaft and extend from outside the gearbox case to the wet clutch on the inside of the hollow shaft.

Each wet clutch may configured to change from being disengaged, or open, to engaged, or closed, at an increase in the pressure of a pneumatic or hydraulic fluid in the pneumatic or hydraulic conduit. Similarly, each wet clutch may be configured to change from being engaged, or closed, to disengaged, or open, at a decrease in the pressure of a pneumatic or hydraulic fluid in the pneumatic or hydraulic conduit. This means that a positive pressure is required to activate a gear assembly, which in turn means that at a loss of pressure there will be no transfer of torque from the first shaft to the output shat. Further, two gear assemblies of the same set will not be activated if one is already activated and the other one loses pressure, which could cause damage the gearbox.

The gearbox case may be configured to hold or contain a lubricating and/or cooling liquid, for example a lubrication oil, for lubricating and/or cooling the gear wheels of each gear assembly, and/or for lubricating and/or cooling the wet clutch of each gear assembly. The fact that the same liquid can be used for gear wheels and the wet coupling significantly reduces the complexity of the gearbox, and allows for the gear wheels and the wet couplings to reside within the same gearbox case, which in extension allows for a smaller more compact gearbox.

BRIEF DESCRIPTION OF THE DRAWINGS

A more complete understanding of the abovementioned and other features and advantages of the proposed technology will be apparent from the following detailed description of preferred embodiments of the proposed technology in conjunction with the appended drawings, wherein:

FIG. 4 is a table listing gear ratios of the gear assemblies of the second embodiment, FIG. 5 is a table listing the gearbox gear ratios of the second embodiment.

DETAILED DESCRIPTION OF THE DRAWINGS

Figure 1:
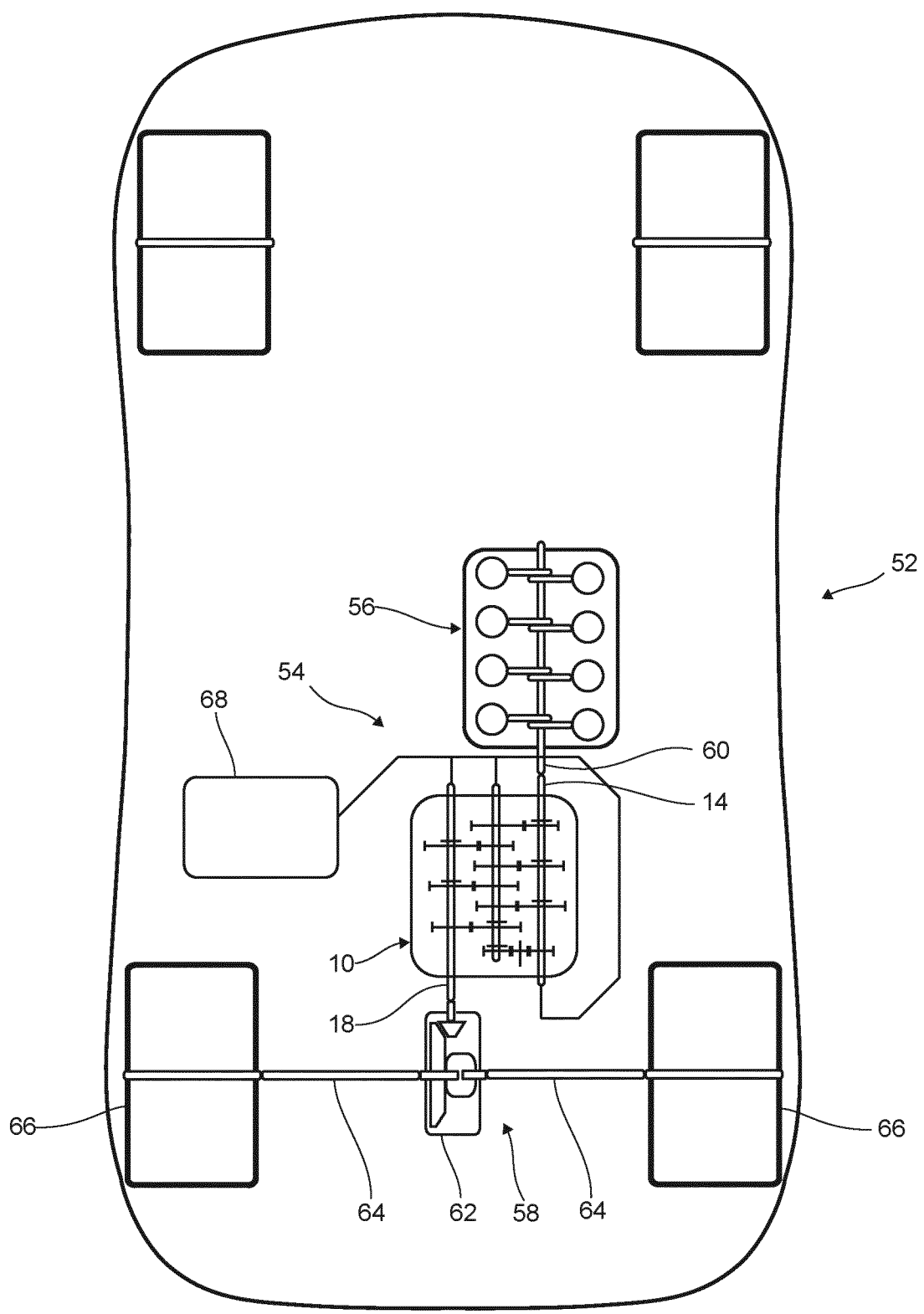
FIG. 1 schematically illustrates an embodiment of a road vehicle.

FIG. 1 schematically illustrates a road vehicle 52 in the form of a car. The road vehicle 52 has a powertrain 54 including an engine 56, a gearbox 10, and a final drive 58. The engine 56 is a reciprocating internal combustion engine having a crank shaft 60 delivering torque from the engine 56. The crank shaft 60 is permanently connected to the input shaft, or first shaft 14, of the gearbox 10 without any clutch or torque converting mechanism, such as a gear set or a torque converter, between the engine 56 and the gearbox 10. The engine 56 also has no flywheel for the purpose smoothing out the intermittent torque output of the engine 56. Instead, the moment of inertia on the first shaft 14 of the gearbox 10 is sufficient to achieve this function. In alternative embodiments the engine has a flywheel.

The output shaft, or third shaft 18, of the gearbox is permanently connected to the final drive 58 without any clutch or torque converting mechanism, such as a gear set or a torque converter, between the gearbox 10 and the final drive 58. The final drive 58 includes a differential 60 that is connected to the rear wheels 66 of the vehicle 52 via a pair of drive axles 64.

Figure 2:
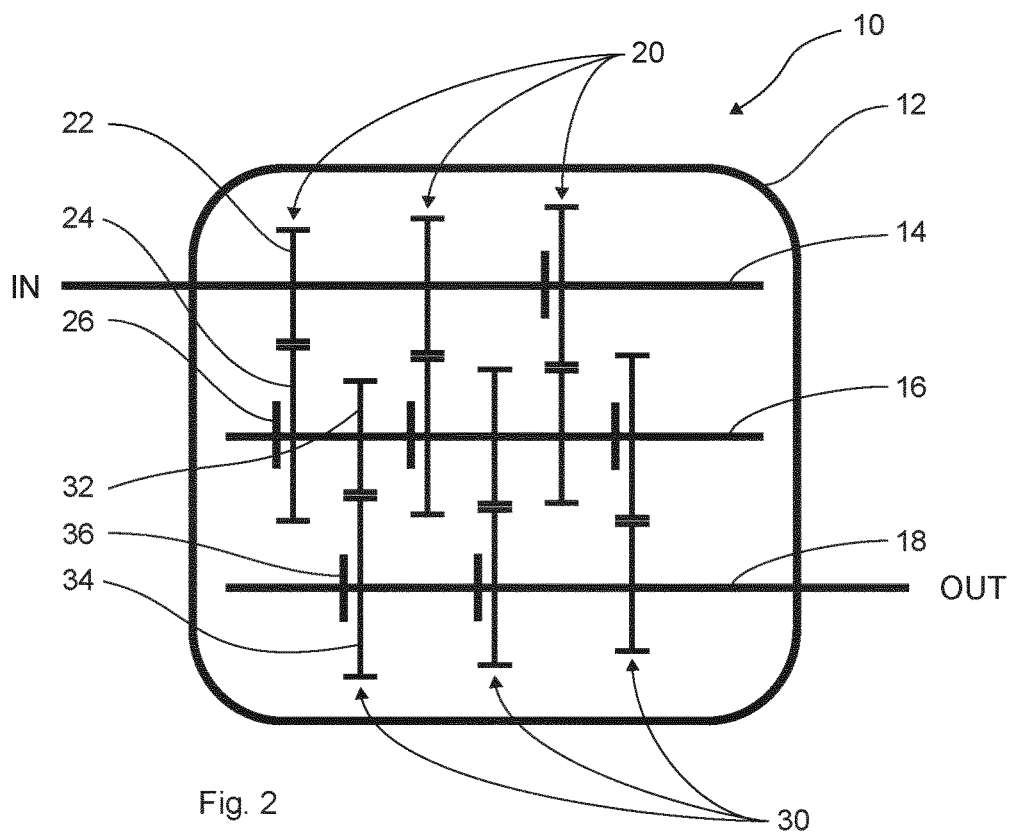
FIG. 2 schematically illustrates a first embodiment of a gearbox.

Details of an embodiment of the proposed gearbox 10 are schematically illustrated in FIG. 2. The gearbox 10 has a gearbox case 12, or a gear housing, that encapsulates and provides mechanical support for the mechanical components of the gearbox 10. The gearbox case 12 is a liquid-tight container and holds a liquid in the form of an oil that lubricates and to some extent cools the mechanical components of the gearbox 10. In this embodiment, the gearbox has the function of a "wet sump" and the gearbox has a valve (not shown) for handling pressure changes within the gearbox case, for example due to heat expansion. In alternative embodiments, the gearbox has the function of a "semi-dry sump" or a "dry sump" with the lubricating liquid circulating to an external cooler and buffered in an interim storage container where air is separated from the liquid.

The gearbox 10 has a first shaft 14 that receives torque to the gearbox 10 and a third shaft 18 that delivers torque from the gearbox. A second shaft 16 is arranged to transfer torque from the first shaft 14 to the third shaft 18, and vice versa. Both of the first shaft 14 and the third shaft extend from the gearbox case 12 are sealed to prevent the lubricating liquid from escaping from inside the gearbox case 12.

The gearbox 10 has two sets of gear assemblies located inside the gearbox case 12. Each gear assembly 20 of the first set has a first gear wheel 22 centered on the first shaft 14 and a second gear wheel 24 centered on the second shaft 16. The gear wheels 22 and 24 are helical cogwheels and the first gear wheel 22 mesh with the second gear wheel 24 of the same gear assembly 20. In the gear assemblies 20, the wet clutch 26 is centered either on the first shaft 14 or on the second shaft 16. Each wet clutch 26 operationally connects the gear wheel 22 or 24 on the same shaft 14 or 16 to the shaft 14 or 16, which in extension means that it operationally connects the first shaft 14 and the second shaft 16. When a wet clutch 26 of the gear assembly is engaged, or closed, the gearbox transfers torque from the first shaft 14 to the second shaft 16 via the first and second gear wheels 22 and 24. When a wet clutch 26 of a gear assembly 20 is disengaged, or open, the gearbox transfers no torque from the first shaft 14 to the second shaft 16 via the first and second gear wheels 22 and 24 of the same gear assembly 20.

Each gear assembly 30 of the second set has a third gear wheel 32 centered on the second shaft 16 and a fourth gear wheel 34 centered on the third shaft 18. The gear wheels 32 and 34 are helical cogwheels and the third gear wheel 32 mesh with the fourth gear wheel 34 of the same gear assembly 30. In the gear assemblies 30, a wet clutch 36 is centered either on the second shaft 16 or on the third shaft 18. Each wet clutch 36 operationally connects the gear wheel 32 or 34 on the same shaft 16 or 18 to the shaft 16 or 18, which in extension means that it operationally connects the second shaft 16 and the third shaft 18. When a wet clutch 36 of the gear assembly 30 is engaged, or closed, the gearbox transfers torque from the second shaft 16 to the third shaft 18 via the third and fourth gear wheels 32 and 34. When a wet clutch 36 of a gear assembly 30 is disengaged, or open, the gearbox transfers no torque from the second shaft 16 to the third shaft 18 via the third and fourth gear wheels 32 and 34 of the same gear assembly 30.

If one wet clutch 26 of the first set and one wet clutch 36 of the second set are engaged and all other wet clutches 26 and 36 are disengaged, torque will be transferred from the first shaft 14 to the third shaft 18. The torque is also converted, and the conversion depends on which of the wet clutches 26 and 36 that are engaged.

If all of the wet clutches 26 of the first set are disengaged, no torque will be transferred from the first shaft 14 to the third shaft 18. Similarly, if all of the wet clutches 36 of the second set are disengaged, no torque will be transferred from the first shaft 14 to the third shaft 18. There are no other mechanisms for transferring torque between the first shaft 14 and the third shaft. This means that the gearbox 10 is configured to convert, or convey, no torque received by the first shaft 14 to a torque delivered by the third shaft 18 if no wet clutch 26, 36 of the gear assemblies 20 or 30 of the first set or the second set is engaged. This also means that none of the shafts 14, 16, and 18 are permanently rotationally locked with respect to one another.

Each set of gear assemblies 20 and 30 has three gear assemblies 20 and 30. The gear assemblies 20 of the first set have different gear ratios between the second shaft 16 and the first shaft 14. Similarly, the gear assemblies 30 of the second set have different gear ratios between the third shaft 18 and the second shaft 16.

Two of the gear assemblies 20 of the first set have a gear ratio greater than one, between the second shaft 16 and the first shaft 14. These have the wet clutches 26 centered on the second shaft 16. One of the gear assemblies 20 of the first set has gear ratio that is less than one. This gear assembly 20 has the wet clutch 26 centered on the first shaft 14. Similarly, two of the gear assemblies 30 of the second set have a gear ratio greater than one, between the third shaft 18 and the second shaft 16. These have the wet clutches 36 centered on the third shaft 16. One of the gear assemblies 30 of the second set has gear ratio that is less than one. This gear assembly 30 has the wet clutch 36 centered on the second shaft 16. The position of the wet clutches 26 and 36 described here aims at minimizing internal rotational differences for a disengaged clutch 26 and 36.

The gearbox 10 has a control unit 68 operationally connected to and configured to engage or disengage each wet clutch 26 and 36 upon receiving an electric command signal for automatic gear shifting when the vehicle 52 is driven.

Figure 3:
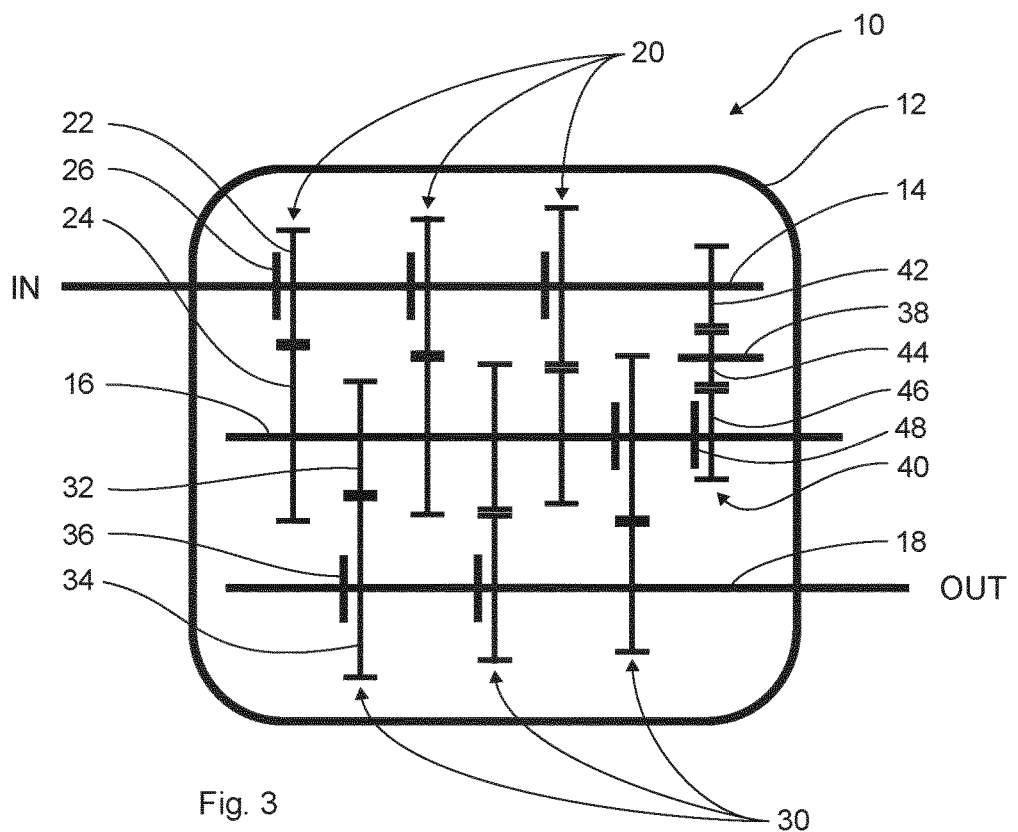
FIG. 3 schematically illustrates a second embodiment of a gearbox.

An alternative embodiment of the proposed gearbox 10 is schematically illustrated in FIG. 3. Apart from the position of the wet clutches 26 and 36 and the addition of a reverse gear, the gearbox 10 is the same the gearbox described in relation to FIG. 2. All gear assemblies 20 of the first set have the wet couplings 26 positioned on the first shaft 14, while the gear assemblies 30 of the second set are positioned as in the previous embodiment.

The reverse gear is provided by a counter shaft 38 and a reverse gear assembly 40 located inside the gearbox case 12. The reverse gear assembly 40 has a fifth gear wheel 42 centered on the first shaft 14, a sixth gear wheel 44 centered on the counter shaft 38, and a seventh gear wheel 46 centered on the second shaft 16, and a wet clutch 48 positioned on the second shaft 14. The fifth gear wheel 42 meshes with the sixth gear wheel 44, and the sixth gear wheel 44 meshes with the seventh gear wheel 46. The wet clutch 48 can engage the reverse gear assembly 40 so that torque is transferred from the first shaft 14 to the second shaft 16 via the fifth gear wheel 42, the sixth gear wheel 44, and the seventh gear wheel 46. When the wet clutch 48 is disengaged, no torque is transferred via the reverse gear assembly 40. This means that the reverse gear assembly 40 operationally connects the first shaft 14 and the second shaft 16 via the sixth gear wheel 44.

The counter shaft 38 and the sixth gear wheel 44 result in a reversed rotational direction of the second shaft 16, and consequently in a reversed rotational direction of the third shaft 18. The reverse gear assembly 40 provides a gear ratio that is greater than one.

FIG. 4 is a table illustrating the different gear ratios of the gearbox 10 of the embodiment described in relation to FIG. 3. The three gear assemblies 20 of the first set have the gear ratios 1.60, 1.24, and 0.97, respectively, thus constituting a first series 1A, 1B, and 10 of gear assemblies 20 with decreasing gear ratios between the second shaft 16 and the first shaft 14. Neighboring gear assemblies 20 in the first series have gear ratios differing by a first multiplicative factor, as is indicated in the table, and all first multiplicative factors deviate from the mean by less than 3%. From a different viewpoint, the first set of gear assemblies 20 is constituted by a first, second and third gear assembly 20, wherein the gear ratio of the second gear assembly 1B is in the range 76-80% of the gear ratio of the first gear assembly 1A, and the gear ratio of the third gear assembly 10 is in the range 76-80% of the gear ratio of the second gear assembly 1B.

The three gear assemblies 30 of the second set have the gear ratios 12.95, 1.41, and 0.67, respectively, thus constituting a second series 2A, 2B, and 2C of gear assemblies 30 with decreasing gear ratios between the third shaft 18 and the second shaft 16. Neighboring gear assemblies 30 in the second series have gear ratios differing by a second multiplicative factor, as is indicated in the table, and all second multiplicative factors deviates from the mean by less than 3%. From a different viewpoint, the second set of gear assemblies 30 is constituted by a fourth, fifth and sixth gear assembly 30, wherein the gear ratio of the fifth gear assembly 2B is in the range 46-50% of the gear ratio of the fourth gear assembly 2A, and the gear ratio of the sixth gear assembly 2C is in the range 46-50% of the gear ratio of the fifth gear assembly 2B.

The mean of the second multiplicative factor deviates by less than 3% from the mean of the first multiplicative factor to the power of three, where the power corresponds to the number of gear assemblies 20 in the first set. Expressed differently, the mean of the second multiplicative factor deviates by less than 3% from the result of an exponentiation with the mean of the first multiplicative factor as the base and the number of gear assemblies 20 in the first set as exponent.

The first set and second set of gear assemblies 20 and 30 combine to give the gears listed in the table of FIG. 5.

Figure 6:
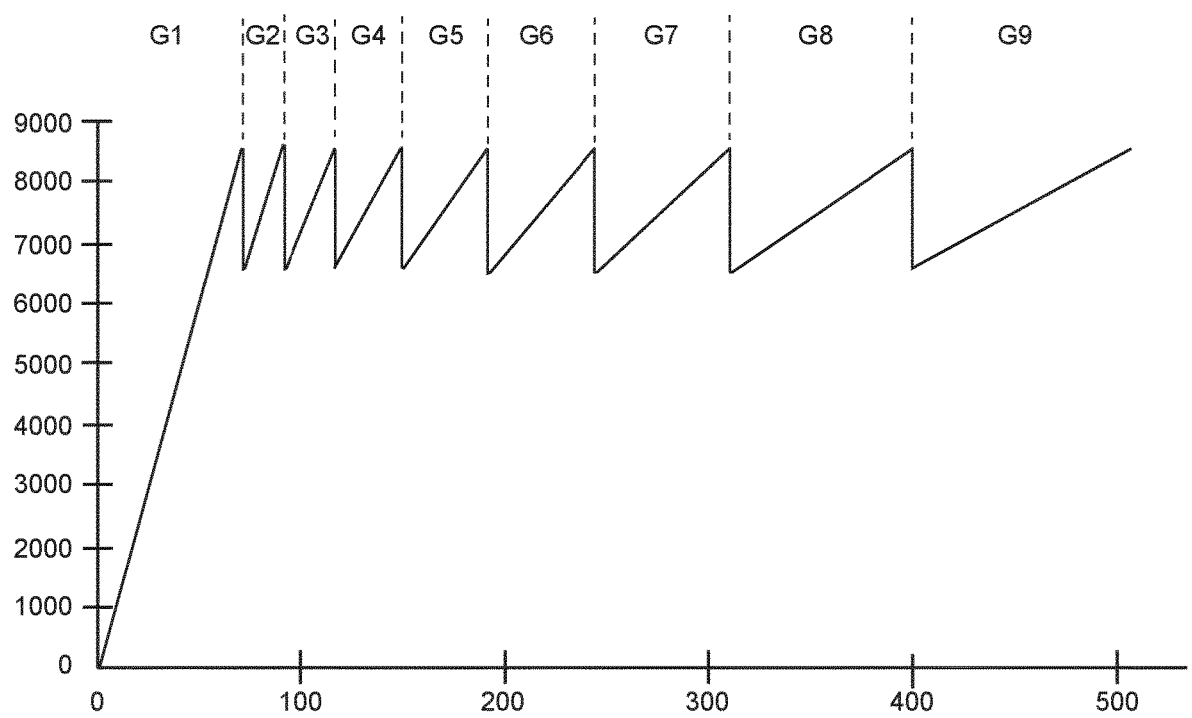
FIG. 6 is a graph illustrating an example of engine to vehicle speeds in a high performance driving, FIG. 7 schematically illustrates a cross section of a wet clutch, and FIG. 8 schematically illustrates a shaft assembly with a wet clutch.

The internal combustion engine 56 is tuned for high torque delivery at engine speeds in the operation interval 6640 to 8500 rpm. It is intended to hold the engine speed in this operation interval during acceleration in high-performance driving. The final drive 58 has a gear ratio of 3.45 and the rear wheels have a diameter of 720 mm. In this configuration, the gearbox 10 performs as a racing oriented close-ratio type transmission. The resulting performance is shown in the graph in FIG. 6 having the vehicle speed in kilometer per hour on the abscissa and the rpm on the ordinate. The speed interval of the first gear is indicated by G1, the speed interval of the second gear is indicated by G2, and so forth.

Figure 7:
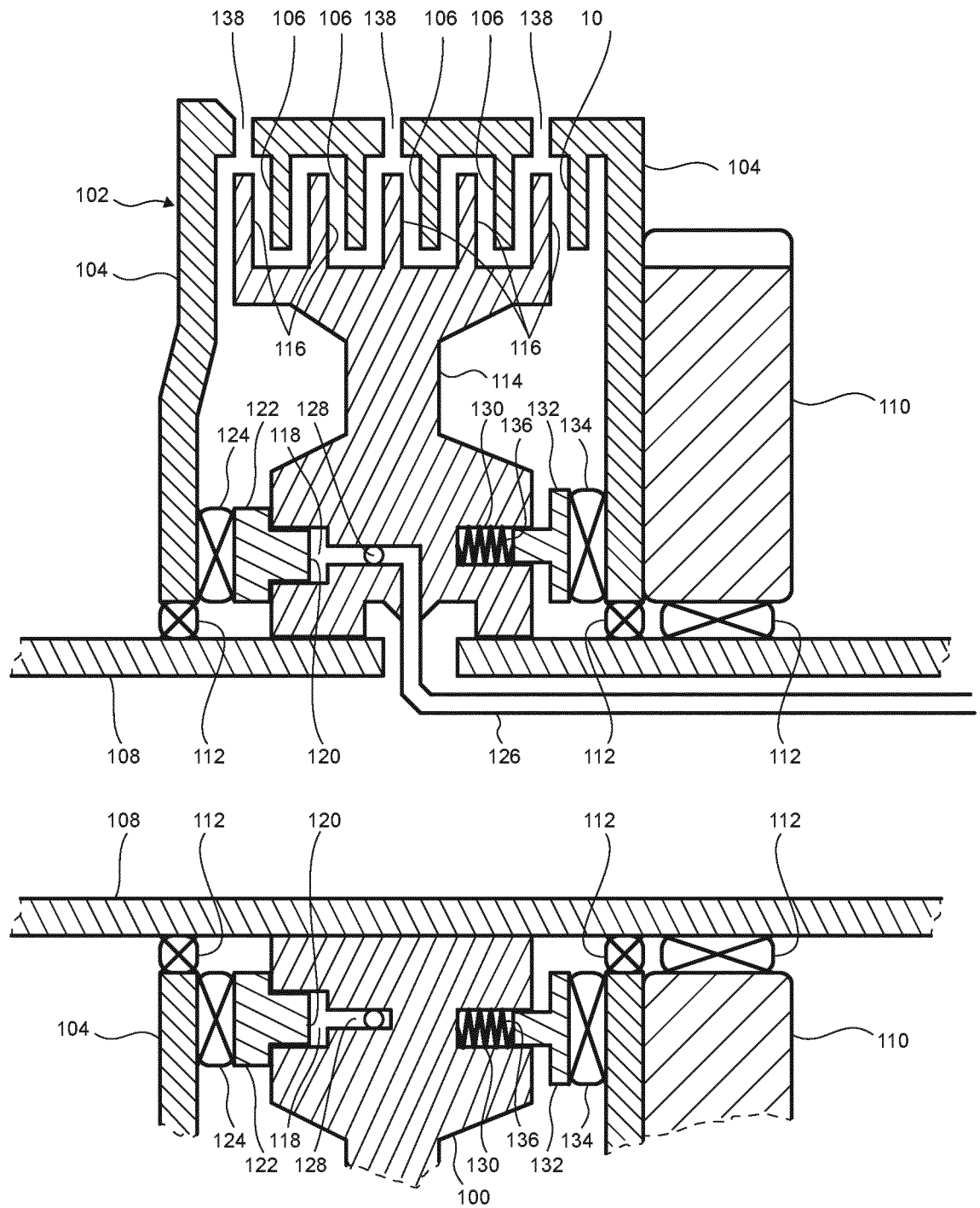

FIG. 7 schematically illustrates a through-cut of a wet clutch 102. Similar wet clutches can be used in the first gear assembly 20, the second gear assembly 30, and the reversed gear assembly 40 in the different embodiments of the proposed technology. The wet clutch 102 is a multiple-plate clutch having a clutch basket 104 with circular clutch plates 106 extending radially inwards relative to the shaft 108 on which the wet clutch 102 is centered. One of the gear wheels 110 of the gear assembly is attached to the clutch basket 104. The clutch basket 104 and the gear wheel 110 are rotationally supported by a number of roller bearings 112, which means that they can rotate freely with respect to the shaft 108. The wet clutch 102 further has a clutch hub 114 with circular clutch plates 116 extending radially outwards relative to the shaft 108. The clutch hub is centered on the shaft 108 and rotationally locked with respect to the shaft 108 by way of cooperating splines (not shown) extending along the shaft 108. The splines allows for the clutch hub 114 to shift lengthwise relative to the shaft 108.

The clutch hub has a number of cylinders 118 distributed evenly around the shaft 108. Cooperating pistons 120 supported on a ring 122 are positioned in the cylinders. A roller bearing 124 is positioned between the ring 122 and the inside of the clutch basket 104 allowing for the clutch hub 114 to rotate relative to the clutch basket 104 when the ring 122 exerts a longitudinal force on the clutch basket 104. A tube 126 connects to an internal conduit 128 that in turn interconnects all of the cylinders 118.

The tube 126, the internal conduit 128, and the cylinders 118 are filled with a hydraulic fluid and an increase in the pressure via the tube 126 then caused the clutch hub 114 to shift in a direction away from the pistons 120. Thus, the clutch hub 114 is configured to shift lengthwise by hydraulic operation. This in turn causes the clutch plates 116 of the clutch hub 114 to engage and exert a pressure on the clutch plates 106 of the clutch basket 104, thereby closing or engaging the wet clutch 102 causing the gear wheel 110 to rotate with the shaft 108.

The clutch hub also has a number of bores 130 distributed evenly around the shaft 108 and oriented in the opposite direction relative to the cylinders 118. Each of the bores 130 houses a spring 136 biasing the clutch hub 114 against a second ring 132, which in turn is forced towards the inside of the clutch hub 114. A roller bearing 134 is positioned between the second ring 132 and the inside of the clutch basket 104 allowing for the clutch hub 114 to rotate relative to the clutch basket 104 when the springs 136, and in extension the second ring 132, exerts a longitudinal force on the clutch basket 104. This construction biases the wet clutch 102 to be open or disengaged. The combined force of the springs 136 must be surpassed by the force resulting from an increase in the pressure of the hydraulic fluid to close or engage the wet clutch 102. When the wet clutch 102 is disengaged, the clutch hub 114 spins freely relative to the clutch basket 104, and when it is engaged, the clutch plates 116 of the clutch hub 114 are pressed against the clutch plates 106 of the clutch basket 104.

The clutch basket 104 has a number of apertures 138 by which the lubricating liquid in the gearbox case 12 to enters the wet clutch 102 and cool of the clutch plates 106 and 116.

Figure 8:
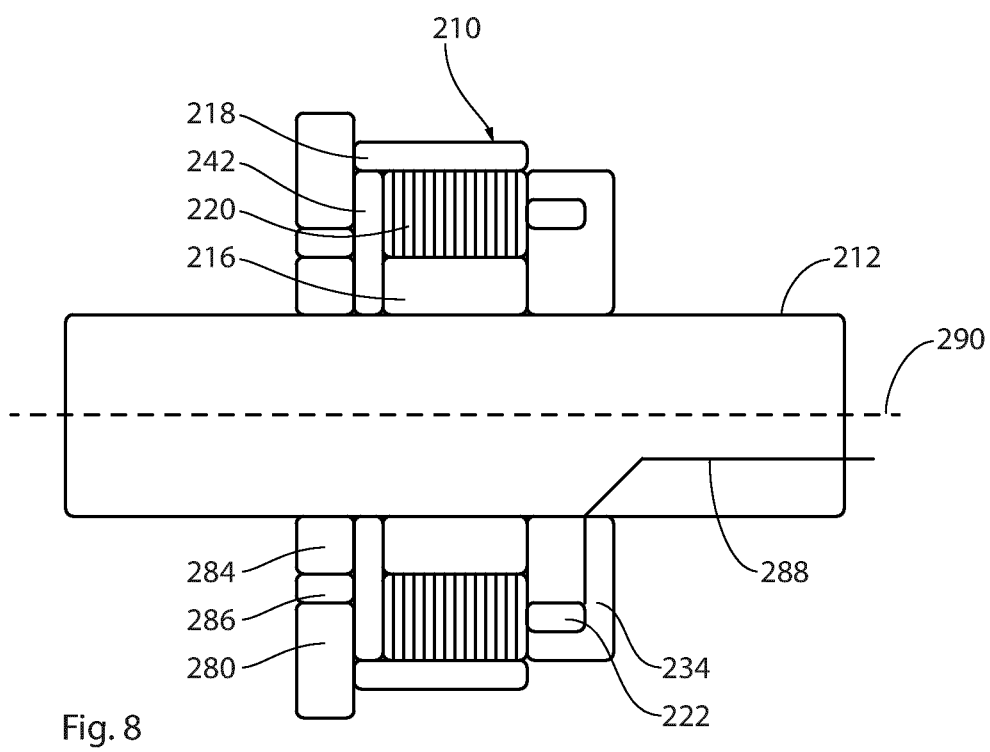

FIG. 8 schematically illustrates a wet clutch 210 mounted on a shaft 212 that can be used in the gearboxes described in relation to FIGS. 2 and 3. The wet clutch 210 can form part of any of the first gear assemblies 20 and the second gear assemblies 30, and the shaft 212 can be any of the first 14, second 16, and third 18 shafts.

A gear wheel 280 is rotationally supported with respect to the shaft 212. The gear wheel 280 and the wet clutch 210 are concentric with respect to the shaft 212. The wet clutch 210 is a multi-plate clutch and the shaft 212 passes through the complete wet clutch 210. The wet clutch 210 has a clutch hub 216 that is mounted on the shaft 212 and radially fixed relative to the shaft 212 by way of splines. It further has a clutch basket 218 that is rotationally supported relative to shaft 212 and a clutch pack 220 that connects the clutch hub 216 and the clutch basket 218. The wet clutch 210 also has a collar 234 that is juxtaposed and attached to the clutch hub 216 by way of bolts. This way, the collar 234 is mounted on and rotationally fixed, or attached to, relative to the shaft 212.

The clutch hub 216 and the clutch basket 218 are concentric with respect to the shaft 212. The clutch hub 216 forms a through hole and the collar 234 forms another through hole. This means that the clutch hub 210 as a whole forms a through hole that receives the shaft 212. The axis 290 of the shaft 212 is indicated by a dashed line.

A ring-shaped radial spacer 284 is rotationally fixed relative to, or attached to, the clutch hub 216 by way of bolts. Thus, it is also rotationally fixed relative to, or attached to, to the shaft 212. A radial rolling bearing 286 is positioned between the radial spacer 284 and the gear wheel and has an inner race attached to the radial spacer 284 and an outer race attached to the gear wheel 280. The gear wheel 280 has a central through bore with a cylindrical inner wall, and the outer race conforms to and engages the inner wall of the through bore.

The gear wheel 280 is fixed to the clutch basket 218. The clutch pack 220 has three states. In the first state, or the disengaged state, the clutch hub 216 and the clutch basket 218 are unlocked and can spin at different speeds. In extension, this means that the gear wheel 280 can spin freely relative to the shaft 212. In the second state, or the slipping state, the clutch hub 216 and the clutch basket 218 are partly locked together but can spin at different speeds. This means that some torque is transferred from the shaft 212 to the gear wheel 280. In the third state, or the engaged state, the clutch hub 216 and the clutch basket 218 are locked together and spin at the same speed. This means that all torque supplied to the shaft 212 is transferred to the gear wheel 80. When activated, the clutch pack 220 is compressed axially and the clutch pack 220 changes from the disengaged state to the engaged state, via the slipping state.

The clutch pack 220 has eight inner plates attached to the clutch hub 216, which constitutes an inner plate carrier, and seven interleaved outer plates attached to the clutch basket 218, which constitutes an outer plate carrier. The inner plates can move axially relative to the clutch hub 216 and are rotationally fixed, or attached to, relative to the clutch hub 216. Similarly, the outer plates can move axially relative to the clutch basket 218 and are rotationally fixed, or attached to, relative to the clutch basket 218. The inner and outer plates are alternating in the clutch pack 220. In the disengaged state there is no mechanical friction between the inner plates and the outer plates, in the slipping state there is a kinetic friction between the inner plates and the outer plates, and in the engaged state there is a static friction between the inner plates and the outer plates.

An actuator 222 formed by an annular recess in the collar 234 and a ring-shaped piston positioned in the recess engages the clutch pack 220. The shaft 212 has an internal shaft conduit 288 for a hydraulic fluid, and the annular recess of the actuator 222 is connected to the internal shaft conduit 288. The actuator 222 is activated by increasing the pressure of the hydraulic fluid, which causes the ring-shaped piston to move towards the clutch pack 220, thereby engaging the wet clutch 210.

The wet clutch 210 further has a radially and outwardly extending flange 242 mounted on and concentric with the shaft 212. The flange 242 is juxtaposed to the clutch hub 216 and the clutch pack 220 is positioned between the flange 242 and the collar 234. The flange 242 is attached to the clutch hub 216 by way of bolts. The clutch pack 220 is pressed against the flange 242 when the clutch pack 220 is engaged by the actuator 222 in the slipping state and in the engaged state of the wet clutch 210.

ITEM LIST 10 gear box
12 gearbox case
14 first shaft
16 second shaft
18 third shaft
20 gear assembly of first set
22 first gear wheel
24 second gear wheel
26 wet-clutch
30 gear assembly of second set
32 third gear wheel
34 fourth gear wheel
36 wet-clutch
38 counter shaft
40 reverse gear assembly
42 fifth gear wheel
44 sixth gear wheel
46 seventh gear wheel
48 wet-clutch
52 vehicle
54 powertrain
56 engine
58 final drive
60 crank shaft
62 differential
64 drive axles
66 rear wheels
68 control unit
102 wet clutch
104 clutch basket
106 clutch plate
108 shaft
110 gear wheel
112 roller bearings
114 clutch hub
116 clutch plates
118 cylinders
120 pistons
122 ring
124 roller bearing
126 tube
128 internal conduit
130 bore
132 ring
134 roller bearing
136 spring
138 apertures
210 wet clutch
212 shaft
216 clutch hub
218 clutch basket
220 clutch pack
222 actuator
234 collar
242 outwardly extending flange
280 gear wheel
284 radial spacer
286 radial rolling bearing
288 internal shaft conduit
290 shaft axis

The invention claimed is:

1. A gearbox for a road vehicle, comprising:
(a) a first shaft, a second shaft, and a third shaft, wherein the first shaft is operable as an input shaft and the third shaft is operable as an output shaft;
(b) a first set of first gear assemblies, wherein each of the first gear assemblies comprises:
a first gear wheel centered on the first shaft;
a second gear wheel centered on the second shaft; and a first wet clutch located on one of the first and second shafts and configured to engage with and disengage from the first gear assembly;
(c) a second set of second gear assemblies, wherein each of the second gear assemblies comprises:
a third gear wheel centered on the second shaft;
a fourth gear wheel centered on the third shaft; and
a second wet clutch on the third shaft and configured to engage with and disengage from the second gear assembly;
(d) a counter shaft; and
(e) a reverse gear assembly comprising a third wet clutch positioned on the second shaft, and a reverse gear set having reverse gear wheels positioned on each of the first shaft, the counter shaft, and the second shaft;
wherein, in each of the first gear assemblies, the first wet clutch is positioned either on the first shaft adjacent the first gear wheel, or on the second shaft adjacent the second gear wheel;
wherein, in each of the second gear assemblies, the second wet clutch is positioned on the third shaft adjacent the fourth gear wheel; and
wherein at least one of the second gear assemblies of the second set of gear assemblies provides a gear ratio of the third shaft over the second shaft that is greater than a gear ratio of the second shaft over the first shaft provided by any of the first gear assemblies of the set of first gear assemblies.

2. The gearbox according to claim 1, wherein the ratio between the highest and lowest gear ratios of the first gear assemblies is smaller than the ratio between the highest and lowest gear ratios of the second gear assemblies.

3. The gearbox according to claim 1, wherein at least two of the first gear assemblies are simultaneously operable in a slipping state during acceleration of the road vehicle.

4. The gearbox according to claim 3, wherein the first wet clutches of the at least two of the first gear assemblies are simultaneously operable in a slipping state at an increasing rotational speed of at least one of the first shaft and the third shaft.

5. The gearbox according to claim 3, wherein the first wet clutches of the at least two of first gear assemblies are simultaneously operable in a slipping state at a zero rotational speed of the third shaft.

6. The gearbox according to claim 1, wherein the first wet clutch of at least one of the first gear assemblies and the second wet clutch of at least one of the second gear assemblies are simultaneously operable in a slipping state.

7. The gearbox according to claim 1, wherein the first and second wet clutches are simultaneously operable to short shift the gearbox.

8. The gearbox according to claim 1, wherein the set of first gear assemblies comprises a first series of gear assemblies with decreasing gear ratios between the second shaft and the first shaft, and with a first one of the first series of gear assemblies having a highest gear ratio in either an engaged state or a slipping state, and with a second one of the first series of gear assemblies having a lowest gear ratio in either the slipping state or a disengaged state, the first one of the first series of gear assemblies having the highest gear ratio is operable to change to a disengaged state, and the second one of the first series of gear assemblies having the lowest gear ratio is operable to an engaged state.

9. The gearbox according to claim 8, wherein the set of second gear assemblies comprises a second series of gear assemblies with decreasing gear ratios between the third shaft and the second shaft, and with a first one of the second series of gear assemblies having a highest gear ratio in either an engaged state or a slipping state, and with a second one of the second series of gear assemblies having a lowest gear ratio in the slipping state or a disengaged state, wherein simultaneously, the first one of the second series of gear assemblies having the highest gear ratio is operable to change to a disengaged state, and wherein the second one of the second series of gear assemblies having the lowest gear ratio is operable to change to an engaged state.

10. The gearbox according to claim 1, wherein the set of first gear assemblies comprises three or more first gear assemblies, and the set of second gear assemblies comprises three or more second gear assemblies.

* * * * *